(12) United States Patent
Terada et al.

(10) Patent No.: US 8,097,079 B2
(45) Date of Patent: Jan. 17, 2012

(54) LAMINATING ADHESIVE

(75) Inventors: Hideki Terada, Toyonaka (JP); Shigetoshi Sasano, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 396 days.

(21) Appl. No.: 12/223,925

(22) PCT Filed: Feb. 14, 2007

(86) PCT No.: PCT/JP2007/052571
§ 371 (c)(1), (2), (4) Date: Aug. 13, 2008

(87) PCT Pub. No.: WO2007/094341
PCT Pub. Date: Aug. 23, 2007

(65) Prior Publication Data
US 2010/0242798 A1  Sep. 30, 2010

(30) Foreign Application Priority Data

Feb. 17, 2006 (JP) .................................. 2006-041236

(51) Int. Cl.
*C09J 4/00* (2006.01)
(52) U.S. Cl. .................................................. 106/287.1
(58) Field of Classification Search .................... None
See application file for complete search history.

(56) References Cited

U.S. PATENT DOCUMENTS

| | | | |
|---|---|---|---|
| 6,288,201 B1 * | 9/2001 | Sasano et al. | 528/83 |
| 6,569,352 B1 * | 5/2003 | Hillshafer et al. | 252/182.27 |
| 6,908,981 B2 * | 6/2005 | Sasano et al. | 528/83 |
| 2002/0035235 A1 | 3/2002 | Gerber et al. | |
| 2003/0096110 A1 * | 5/2003 | Terada et al. | 428/345 |
| 2005/0143552 A1 | 6/2005 | Ikeda et al. | |

FOREIGN PATENT DOCUMENTS

| | | |
|---|---|---|
| JP | 60-243182 | 12/1985 |
| JP | 3-68916 | 10/1991 |
| JP | 5-51574 | 3/1993 |
| JP | 2000-282010 | 10/2000 |
| JP | 2002-105182 | 4/2002 |
| JP | 2005-132902 | 5/2005 |
| WO | WO 2006/117886 A1 | 11/2006 |

* cited by examiner

*Primary Examiner* — Melvin Mayes
*Assistant Examiner* — Stefanie Cohen
(74) *Attorney, Agent, or Firm* — Foley & Lardner LLP

(57) ABSTRACT

A laminating adhesive includes a polyol; an acid-modified polyol obtained by reaction of a hydrophobic polyol containing a hydrocarbon moiety having 12 to 80 carbon atoms in its molecule in an amount of 30 to 95% by weight or a derivative thereof with an aromatic polycarboxylic acid anhydride and having a carboxyl group at a molecular terminal thereof; an organic polyisocyanate compound; and a silane coupling agent.

A laminating adhesive film is excellent even after high-temperature sterilization treatment in adhesion performance between a metal foil or a barrier film and a plastic film serving as an inner layer, and also in adhesion performance between a metal foil or a barrier film and a plastic film serving as an outer layer.

4 Claims, No Drawings

LAMINATING ADHESIVE

TECHNICAL FIELD

The present invention relates to a laminating adhesive. More particularly, the present invention relates to a laminating adhesive useful for production of packaging materials used in various industrial fields, including packaging materials for food products, beverages, medical products, and quasi-drugs.

BACKGROUND ART

Recently, composite films, which are produced by laminating component materials, including plastic films, metal foils such as aluminum foils, and barrier films such as metal deposited films and silica deposited films, by use of adhesive, has been widely used for packaging materials used in various industrial fields, including packaging materials for food products, beverages, medical products and quasi-drugs.

As laminating adhesives used for production of these composite films, two-part curing urethane adhesives made of a main component including polyester polyol or polyether polyol and a curing agent including organic polyisocyanate compound are widely used from a viewpoint that two-part curing urethane adhesives have excellent adhesion performance.

In recent years, in view of the importance of hygiene control, packaging bags made using these composite films are generally subjected to high-temperature sterilization treatment such as hot-water spray sterilization treatment, hot-water rotary sterilization treatment, or steam rotary sterilization treatment. However, there are some disadvantages such that, in composite films including metal foils and barrier films, particularly including metal foils, the plastic film and the metal foil in the composite film are peeled off from each other after the high-temperature sterilization treatment; when, as contents, acid food products such as vinegar, sauce and soy sauce, oily food products, or a mixture thereof are packed and then subjected to high-temperature sterilization treatment, the adhesive strength between the metal foil and the plastic film is remarkably reduced after the high-temperature sterilization treatment, or the metal foil and the plastic film are peeled off from each other.

As a method for overcoming the above disadvantages, a method for partially carboxylating terminal hydroxyl groups of the polyester polyol contained in the main component is known.

There has been proposed, for example, a dry laminating adhesive including a polyester composition having a carboxyl group at its molecular terminal and an isocyanate compound, in which the polyester composition includes polyester (A) having two or more hydroxyl groups at the terminal and having a molecular weight of 5000 to 10000, and polyester (B) obtained by carboxylating at least one of the terminal hydroxyl groups (cf. Patent Document 1, for example).

In addition, for example, an adhesive composition containing a mixture of 10 to 90% by weight of polyester polyurethane polyol and 10 to 90% by weight of polyester resin having a carboxyl group at its molecular terminal, orthophosphoric acid or its ester compound, and an organic isocyanate compound has been proposed (cf. Patent Document 2, for example).

Patent Document 1: Japanese Examined Patent Publication No. 03-68916
Patent Document 2: Japanese Unexamined Patent Publication No. 05-51574

DISCLOSURE OF THE INVENTION

Problems to be Solved

The adhesives described in Patent Document 1 and Patent Document 2 above can provide improvements in adhesion against acid food products and oily food products between the metal foil and the plastic film serving as an inner layer thereof (inside of the packaging bag) after high-temperature sterilization treatment, but have reduced hot water resistance between the metal foil and the plastic film serving as an outer layer thereof (outside of the packaging bag), which may tend to cause delamination therebetween after high-temperature sterilization treatment.

In particular, the composition in which a plastic film having a shrinkability in hot water, such as a nylon film, is laminated on the outer layer of the aluminum foil can easily cause delamination.

It is an object of the present invention to provide a laminating adhesive, which is excellent even after high-temperature sterilization treatment in adhesion performance between a metal foil or a barrier film and a plastic film serving as an inner layer, and also in adhesion performance between a metal foil or a barrier film and a plastic film serving as an outer layer.

Solution to the Problem

To achieve the object above, the laminating adhesive of the present invention includes a polyol; an acid-modified polyol obtained by reaction of a hydrophobic polyol containing a hydrocarbon moiety having 12 to 80 carbon atoms in its molecule in an amount of 30 to 95% by weight or a derivative thereof with an aromatic polycarboxylic acid anhydride and having a carboxyl group at a molecular terminal thereof; an organic polyisocyanate compound; and a silane coupling agent.

In the laminating adhesive of the present invention, it is preferable that the hydrophobic polyol includes castor oil and/or dimer acid ester-containing polyester polyol.

In the laminating adhesive of the present invention, it is preferable that the acid-modified polyol is obtained by reaction of an aromatic polycarboxylic acid anhydride with 5% by mol or more of all the terminal hydroxyl groups of the hydrophobic polyol or the derivative thereof.

It is preferable that the laminating adhesive of the present invention further includes an oxyacid of phosphorus or a derivative thereof.

Effect Of The Invention

When a composite film is produced by laminating a plastic film on both the inner and the outer sides of a metal foil or a barrier film using the laminating adhesive of the present invention, and a packaging bag is then produced from the composite film, not only peeling between the metal foil or the barrier film and the plastic film serving as an inner layer and lowering of the adhesive strength therebetween can be suppressed even after high-temperature sterilization treatment, but also peeling between a metal foil or a barrier film and a plastic film serving as an outer layer and lowering of the adhesive strength therebetween can be suppressed.

Embodiment Of The Invention

The laminating adhesive of the present invention contains a polyol, an acid-modified polyol, an organic polyisocyanate compound, and a silane coupling agent.

In the present invention, the polyol is not particularly limited, and polyols having a functionality of 2 to 6, preferably 2 to 4, and having a number average molecular weight of 200 to 200000, preferably 300 to 100000, more preferably 300 to 50000, may be used.

More specifically, macropolyols, such as polyester polyol, polyether polyol, polyester amide polyol, acrylic polyol, polyhydroxyalkane, natural oil polyol, polyurethane polyol, or mixtures thereof may be used.

The polyester polyols that may be used include, for example, polyester polyols obtained by esterification reaction of dibasic acids such as terephthalic acid, isophthalic acid, adipic acid, azelaic acid, sebacic acid, naphthalene acid, dimer acid and hydrogenated dimer acid, or dialkyl esters thereof, or mixtures thereof with glycols such as ethylene glycol, propylene glycol, diethylene glycol, butylene glycol, neopentyl glycol, 1,6-hexane glycol, 3-methyl-1,5-pentanediol, 3,3'-dimethylolheptane, polyoxy ethylene glycol, polyoxypropylene glycol, polytetramethylene ether glycol, and dimer acid diol, or mixtures thereof; or polyester polyols obtained by ring opening polymerization of lactones such as polycaprolactone, polyvalerolactone, and poly(β-methyl-γ-valerolactone). Of these polyester polyols, dimer acid ester-containing polyester polyols, in which dimer acids or dialkyl esters thereof are contained as the dibasic acids or dialkyl esters thereof which are raw materials, are preferable.

The polyether polyols that may be used include, for example, polyether polyols obtained by addition polymerization of oxirane compounds, such as ethylene oxide, propylene oxide, butylene oxide and tetrahydrofuran by using low-molecular-weight polyol, such as water, ethylene glycol, propylene glycol, trimethylolpropane and glycerin, as initiator.

The polyester amide polyols that may be used include, for example, polyester amide polyols obtained by using low molecular weight polyamine such as ethylene diamine, propylene diamine, hexamethylene diamine and isophorone diamine, in combination in the esterification reaction of the polyester polyols mentioned above. Of these polyester amide polyols, dimer acid ester-containing polyester amide polyol with low molecular weight polyamine used in combination in the esterification reaction of the dimer acid ester-containing polyester polyol mentioned above is preferably used.

The acrylic polyols that may be used include, for example, acrylic polyols obtained by copolymerization of polymerizable monomers having one or more hydroxyl groups in one molecule, such as hydroxyethyl acrylate, hydroxypropyl acrylate and hydroxybutyl acrylate, or their corresponding methacrylic acid derivatives, with acrylic acid, methacrylic acid or their esters.

The polyhydroxyalkanes that may be used include, for example, liquid rubbers obtained by polymerization of butadiene or by copolymerization of butadiene with acrylamide, or the like.

The natural oil polyols that may be used include, for example, castor oil and palm oil.

The polyurethane polyols that may be used include, for example, polyurethane polyols, which are polyols having a urethane bond in one molecule, obtained by reaction of polyether polyol, polyester polyol, polyester amide polyol or the like having a number average molecular weight of 200 to 5000, with the organic polyisocyanate compound described later in an equivalent ratio of the isocyanate group to the hydroxyl group (NCO/OH) of less than 1, preferably 0.8 or less.

Further, in addition to the macropolyols mentioned above, a low-molecular-weight polyol having a molecular weight of 62 to 200 may be mixed as the polyol for the purpose of adjusting the average molecular weight of polyols. Those low-molecular-weight polyols include, for example, glycols usually used in the production of polyester polyols, such as ethylene glycol, propylene glycol, butylene glycol, diethylene glycol, dipropylene glycol, hexylene glycol, neopentyl glycol and cyclohexanedimethanol; and at least trifunctional polyols, such as glycerin, trimethylolpropane and pentaerythritol.

These polyols may be used alone or in combination of two or more kinds, and preferable is micropolyol, more preferable are polyester polyol, polyurethane polyol and polyester amide polyol.

In the present invention, the acid-modified polyols that may be used include acid-modified polyols obtained by reaction of a hydrophobic polyol containing a hydrocarbon moiety having 12 to 80 carbon atoms in its molecule in an amount of 30 to 95% by weight or a derivative thereof with an aromatic polycarboxylic acid anhydride and having a carboxyl group at a molecular terminal thereof.

The acid-modified polyol is not particularly limited, and acid-modified polyols having a functionality of 1 to 8, preferably 2 to 5, a number average molecular weight of 500 to 5000, preferably 800 to 3000, and an acid value of 1000 mg KOH/g or less, preferably 200 mg KOH/g or less and usually 10 mg KOH/g or more, may be used.

The hydrophobic polyol is not particularly limited as long as the hydrophobic polyol has a hydrocarbon moiety having 12 to 80 carbon atoms, preferably 18 to 60 carbon atoms, in its molecule in an amount of 30 to 95% by weight and at least one, preferably two or more, hydroxyl groups, and for example, castor oil and dimer acid ester-containing polyester polyol may be used. These may be used alone or in combination of two or more kinds.

The castor oil that may be used generally include nondrying oil containing ricinoleic acid as its main component, and further containing oleic acid, linolic acid, stearic acid or the like, having a saponification value of 176 to 187, a hydroxyl value of 156 to 165 mg KOH/g and an acid value of 0.1 to 4.0 mg KOH/g. Hardened castor oil obtained by hydrogenating the unsaturated group in castor oil may be used in combination with or substituted for castor oil.

The dimer acid ester-containing polyester polyols that may be used include dimer acid ester-containing polyester polyols in which dimer acids or dialkyl esters thereof, which are raw materials, are contained as the dibasic acids or dialkyl esters thereof.

More specifically, the dimer acid ester-containing polyester polyols can be obtained by, for example, esterification reaction of dibasic acids containing dimer acids or dialkyl esters thereof, or mixtures thereof with glycols.

The dimer acid generally contains an unsaturated fatty acid having 18 carbon atoms as its major raw material, and further contains a small amount of trimer acid and monomer acid corresponding to the unsaturated fatty acid. Hydrogenated dimer acid obtained by hydrogenating the unsaturated group in the dimer acid may be used in combination with or substituted for the dimer acid.

The hydrophobic polyol contains a hydrocarbon moiety having 12 to 80 carbon atoms, preferably 18 to 60 carbon atoms, in an amount of 30 to 95% by weight, preferably 40 to 80% by weight. When the hydrocarbon moiety having 12 to 80 carbon atoms, preferably 18 to 60 carbon atoms, is less than 30% by weight, water resistance may be poor. When the hydrocarbon moiety of the hydrocarbon polyol is more than 95% by weight, the hydrophobic polyol may not be industrially available.

The derivatives of the hydrophobic polyols that may be used include, for example, reactants of a hydrophobic polyol with a dibasic acid (e.g., phthalic acid and isophthalic acid) which is a raw material of the polyester polyol mentioned above, or with a polyester polyol; and reactants of a hydrophobic polyol with an organic polyisocyanate compound described later (e.g., alicyclic diisocyanate described later).

It is preferable that the derivative of the hydrophobic polyol is obtained by reacting the terminal hydroxyl group in an amount of less than 60% by mol, further less than 30% by mol, of all the terminal hydroxyl groups in the hydrophobic polyol, with a dibasic acid or a carboxylic acid in the polyester polyol, or an isocyanate group in the organic polyisocyanate compound.

The aromatic polycarboxylic acid anhydrides that may be used include, for example, phthalic anhydride, trimellitic anhydride and pyromellitic dianhydride. Preferable is trimellitic anhydride.

The ratio (acid modification ratio) of reacting the hydrophobic polyol or a derivative thereof with the aromatic polycarboxylic acid anhydride is not particularly limited, and, for example, the ratio of reacting the terminal hydroxyl group in an amount of 5% by mol or more, preferably 10% by mol or more, more preferably 20% by mol or more, and less than 80% by mol, preferably less than 70% by mol, of all the terminal hydroxyl groups in the hydrophobic polyol or a derivative thereof with the carboxylic acid of the aromatic polycarboxylic acid anhydride may be preferable.

The acid-modified polyol can be obtained by reacting the hydrophobic polyol or a derivative thereof with the aromatic polycarboxylic acid anhydride in the above-mentioned ratio at a temperature of, for example, 80 to 200° C. The reaction causes a ring-opening addition of the aromatic polycarboxylic acid anhydride to the terminal hydroxyl group of the hydrophobic polyol or the derivative thereof, so that the hydrophobic polyol or the derivative thereof is acid-modified.

The acid-modified polyol is mixed in a ratio of, for example, 0.1 to 30 parts by weight, preferably 1 to 15 parts by weight, to 100 parts by weight of the polyol mentioned above.

In the present invention, the organic polyisocyanate compound is not particularly limited, and the organic polyisocyanate compounds that may be used include, for example, polyisocyanate monomers having a functionality of 2 to 4 and modified polyisocyanate monomers thereof.

The polyisocyanate monomers that may be used include, for example, aliphatic diisocyanate, alicyclic diisocyanate, aralkyl diisocyanate and aromatic diisocyanate.

The aliphatic diisocyanates that may be used include, for example, hexamethylene diisocyanate (HDI), trimethylene diisocyanate, tetramethylene diisocyanate, pentamethylene diisocyanate, 1,2-, 2,3- or 1,3-butylene diisocyanate, and 2,4, 4- or 2,2,4-trimethyl hexamethylene diisocyanate.

The alicyclic diisocyanates that may be used include, for example, 3-isocyanatomethyl-3,5,5-trimethylcyclohexyl isocyanate (isophorone diisocyanate, IPDI), 4,4'-, 2,4'- or 2,2'-dicyclohexylmethane diisocyanate or mixture thereof (hydrogenated MDI), 1,3-, 1,4-bis(isocyanatomethyl) cyclohexane or mixture thereof (hydrogenated XDI), 1,3-cyclopentene diisocyanate, 1,4-cyclohexane diisocyanate, 1,3-cyclohexane diisocyanate, methyl-2,4-cyclohexane diisocyanate and methyl-2,6-cyclohexane diisocyanate.

The aralkyl diisocyanates that may be used include, for example, 1,3- or 1,4-xylylene diisocyanate or mixture thereof (XDI), 1,3- or 1,4-tetramethyl xylylene diisocyanate or mixture thereof (TMXDI) and ω,ω'-diisocyanate-1,4-diethylbenzene.

The aromatic diisocyanates that may be used include, for example, 4,4'-, 2,4'- or 2,2'-diphenylmethane diisocyanate or mixture thereof (MDI), 2,4- or 2,6-tolylene diisocyanate or mixture thereof (TDI), 4,4'-toluidine diisocyanate (TODI), 1,5-naphthalene diisocyanate (NDI), m- or p-phenylene diisocyanate or mixture thereof, 4,4'-diphenyl diisocyanate and 4-4'-diphenylether diisocyanate.

The modified polyisocyanate monomers that may be used include, for example, polymers (e.g., dimers and trimers) of the polyisocyanate monomers mentioned above; and modified biurets, modified allophanates, modified oxadiazinetriones, and further, modified polyols prepared by reaction of the polyisocyanate monomers or polymers mentioned above with water, polyhydric alcohol, carbon dioxide gas, and the above-mentioned polyol, respectively.

These organic polyisocyanate compounds may be used alone or in combination of two or more kinds, and preferable are hexamethylene diisocyanate, 3-isocyanatomethyl-3,5,5-trimethylcyclohexyl isocyanate, 4,4'-methylene bis(cyclohexyl isocyanate), 1,4- or 1,3-bis(isocyanatomethyl)cyclohexane, 1,3- or 1,4-xylylene diisocyanate or mixture thereof and modified polyisocyanates thereof.

The organic polyisocyanate compound is mixed, for example, in an equivalent ratio (NCO/OH) of the isocyanate group to the total amount of the hydroxyl groups in the polyol and the acid-modified polyol of, for example, 0.4 to 10, preferably 0.5 to 2.0.

In the present invention, the silane coupling agents that may be used include any compounds having structural formula of R—Si≡(X)$_3$ or R—Si≡(R') (X)$_2$ (wherein R represents an organic group having a vinyl, epoxy, amino, imino, isocyanate or mercapto group; R' represents a lower alkyl group; and X represents a methoxy or ethoxy group, or chlorine atom). For example, chlorosilanes, such as vinyltrichlorosilane; aminosilanes, such as N-β-(aminoethyl)-γ-aminopropyltrimethoxysilane, γ-aminopropyltriethoxysilane, N-β-(aminoethyl)-γ-propylmethyl dimethoxysilane, n-(dimethoxymethylsilylpropyl)ethylenediamine, n-(triethoxysilylpropyl)ethylenediamine and N-phenyl-γ-aminopropyltrimethoxysilane; epoxysilanes, such as γ-glycidoxypropyltrimetoxysilane, γ-glycidoxypropyltriethoxysilane, β-(3,4-epoxycyclohexyl)ethyltrimethoxysilane and di(γ-glycidoxypropyl)dimethoxysilane; vinyl silanes, such as vinyltriethoxysilane; and isocyanate silanes, such as 3-isocyanatepropyltrimethoxysilane and 3-isocyanatepropyltriethoxysilane may be used. These silane coupling agents may be used alone or in combination of two or more kinds, and aminosilanes and epoxysilanes are preferable.

The silane coupling agent is mixed, for example, in a ratio of not less than 0.1% by weight and not more than 5.0% by weight, in the laminating adhesive. With less than 0.1% by weight of the silane coupling agent, peeling may tend to occur between the metal foil or the barrier film and the plastic film serving as an outer layer after high-temperature sterilization treatment. With more than 5.0% by weight of the silane coupling agent, acid resistance may be reduced, which may impair the flavor of the contents.

It is preferable that the laminating adhesive of the present invention further contains an oxyacid of phosphorus or a derivative thereof. The oxyacids of phosphorus that may be used include, for example, phosphoric acids, such as hypophosphorous acid, phosphorous acid, orthophosphoric acid and hypophosphoric acid; and condensed phosphoric acids, such as metaphosphoric acid, pyrophosphoric acid, tripoliphosphoric acid, polyphosphoric acid and ultraphosphoric acid.

The derivatives of the oxyacids of phosphorus that may be used include, for example, salts such as sodium salts and potassium salts, of phosphoric acids or condensed phosphoric acids; monoesters, such as monomethyl orthophosphate, monoethyl orthophosphate, monopropyl orthophosphate, monobutyl orthophosphate, mono-2-ethylhexyl orthophosphate, monophenyl orthophosphate, monomethyl phosphite, monoethyl phosphite, monopropyl phosphite, monobutyl phosphite, mono-2-ethylhexyl phosphite and monophenyl phosphite; di- and tri-esters, such as di-2-ethylhexyl orthophosphate, diphenyl orthophosphorate, trimethyl orthophosphate, triethyl orthophosphate, tripropyl orthophosphate, tributyl orthophosphate, tri-2-ethylhexyl orthophosphate, triphenyl orthophosphate, dimethyl phosphite, diethyl phosphite, dipropyl phosphite, dibutyl phosphite, di-2-ethylhexyl phosphite, diphenyl phosphite, trimethyl phosphite, triethyl phosphite, tripropyl phosphite, tributyl phosphite, tri-2-ethylhexyl phosphite and triphenyl phosphite; or mono-, di- and triesters obtained from condensed phosphoric acids and alcohols.

These oxyacids of phosphorus or their derivatives may be used alone or in combination of two or more kinds, and those having at least one free oxyacid, such as orthophosphoric acids and polyphosphoric acids, are preferable.

The oxyacid of phosphorus or its derivative is mixed, for example, in a ratio of not less than 0.01% by weight and not more than 1.0% by weight, in the laminating adhesive. With less than 0.01% by weight of the oxyacid of phosphorus or its derivative, the acid resistance may be poor. With more than 1.0% by weight of the oxyacid of phosphorus or its derivative, adhesive strength may be reduced.

Further, additives, such as epoxy resins, catalysts, coating improvers, leveling agents, antifoaming agents, stabilizers (including antioxidants and ultraviolet absorbers), plasticizers, surfactants, pigments, fillers, organic or inorganic fine particles and antifungal agents may be mixed with the laminating adhesive of the present invention, if required. The mixing ratio of these additives is appropriately determined according to purposes and applications.

The laminating adhesive of the present invention is not particularly limited as long as each of the components mentioned above is mixed in the above-mentioned ratio, and for example, the laminating adhesive is prepared as a two-part curing urethane adhesive including a main component including polyol and acid-modified polyol, and a curing agent including organic polyisocyanate compound.

The laminating adhesive of the present invention is preferably prepared so as to have a whole acid value of 20 mg KOH/g or less, preferably 4 to 10 mg KOH/g.

The main component can be prepared by, for example, diluting the polyol and the acid-modified polyol, which are mentioned above, with an organic solvent.

The organic solvent is not particularly limited as long as it is inert toward the polyol and the acid-modified polyol, and further the organic polyisocyanate compound. The organic solvents that may be used include, for example, ester solvents, such as ethyl acetate and butyl acetate; ketone solvents, such as methyl ethyl ketone and methyl isobutyl ketone; and aromatic solvents, such as toluene and xylene.

As for the main component, for example, when the polyol and the acid-modified polyol are mixed with the curing agent, and the mixing viscosity thereof is about 100 to 10000 mPa·s, preferably about 100 to 5000 mPa·s, in the temperature range between room temperature and 100° C., the polyol and the acid-modified polyol may be used as they are as the main component, without being diluted with the organic solvent.

The curing agent can be prepared by, for example, diluting the above-mentioned organic polyisocyanate compound with an organic solvent. The organic solvents that may be used include the same organic solvents as mentioned above.

As for the curing agent, for example, when the organic polyisocyanate compound is mixed with the main component, and the mixing viscosity thereof is about 100 to 10000 mPa·s, preferably about 100 to 5000 mPa·s, in the temperature range between room temperature and 100° C., the organic polyisocyanate compound may be used as it is as the curing agent, without being diluted with the organic solvent.

The silane coupling agent, the oxyacid of phosphorus or its derivative, or other additives may be mixed with either or both of the main component and the curing agent. These compounds are usually mixed with the main component although the mixing is appropriately determined according to purposes and applications.

When the laminating adhesive of the present invention is prepared in the form of a two-part curing urethane adhesive, the main component and the curing agent are separately prepared beforehand. These main component and curing agent thus prepared are mixed upon use, and the resulting mixture is applied to adherend. As described above, this two-part curing urethane adhesive, in which the base resin and the curing agent are separately prepared, can provide an extended pot life, and also can be used as an adhesive excellent in adhesive strength with fast curing by mixing the main component and the curing agent only in a necessary minimum amount upon use.

The laminating adhesive of the present invention is suitably used as a laminating adhesive when a metal foil or a barrier film and a plastic film are laminated as adherends to produce a composite film.

For example, when the main component and the curing agent both diluted with the organic solvent are used, the main component and the curing agent are mixed, and thereafter, this mixture is applied to a surface of each film by a solvent type laminator. Then, after the solvent is evaporated, the adhesion surfaces are bonded to each other and then aged to be cured at room temperature or under heating. The amount of the mixture applied is in the range of, for example, 2.0 to 5.0 g/m² after evaporation of the solvent.

On the other hand, when the main component and the curing agent which are not diluted with the organic solvent are used, the main component and the curing agent are mixed, and thereafter, this mixture is applied to a surface of each film by a solvent-free type laminator. Then, the adhesion surfaces are bonded to each other and then aged to be cured at room temperature or under heating. The amount of the mixture applied is in the range of, for example, 1.0 to 3.0 g/m².

The metal foil or the barrier film that may be used as adherend include, for example, metallic foils, such as aluminum foil, stainless steel foil, iron foil, copper foil and lead foil; and other films such as metal deposited films and silica deposited films. The plastic films that may be used as adherend include, for example, polyethylene terephthalate film, nylon film, polyethylene film, polypropylene film and polyvinyl chloride film.

Packaging bags made of the composite film produced using the laminating adhesive of the present invention have excellent adhesion performance between layers, that is, between the metal foil or the barrier film and the plastic film, particularly between the metal foil and the plastic film, further between the metal foil and the plastic film serving as the outer layer thereof, even after subjected to high-temperature sterilization treatment, such as hot-water spray sterilization treatment, hot-water rotary sterilization treatment or steam rotary sterilization treatment, and can remarkably reduce the occurrence of peeling between the layers.

Therefore, the laminating adhesive of the present invention is excellent in adhesiveness for lamination, heat-and-humidity resistance, and aptitude for high-temperature sterilization (resistance to hot water and contents), so that it can be suitably used for the laminating adhesive used for producing packaging materials in various industrial fields, including packaging materials for food products, beverages, medical products and quasi-drugs. More specifically, the laminating adhesive of the present invention can further suppress peeling in the composite in which a plastic film having a shrinkability in hot water, such as a nylon film, is laminated on the outer layer of the aluminum foil.

EXAMPLES

While in the following, the present invention will be described in further detail with reference to Examples, the present invention is not limited to any of them. In Examples and Comparative Examples, the units "part(s)" and "%" are on a weight basis, unless otherwise noted.

Synthesis Example 1

Production of Polyol A

The amount 332.6 g of isophthalic acid, 108.8 g of ethylene glycol, 105.2 g of neopentyl glycol, 155.0 g of 1,6-hexandiol and 0.21 g of zinc acetate as a catalyst were mixed, and the mixture was subjected to esterification reaction at 180 to 220° C. under a nitrogen gas stream. After a prescribed amount of water was distilled, 14.8 g of adipic acid was added thereto and the reaction product was subjected to esterification reaction at 220 to 230° C. The reaction system was then gradually depressurized, and the reaction product was subjected to condensation reaction at 220 to 230° C. for 60 minutes, followed by condensation reaction at 220 to 230° C., 133 to 266 Pa for 4 hours, to give a polyester polyol having a number average molecular weight of 5500. The polyester polyol thus obtained was dissolved in 596.9 g of ethyl acetate, to produce Polyol A in the form of a solution having a solid content of 50%.

Synthesis Example 2

Production of Polyol B

The amount 245.4 g of isophthalic acid, 61.4 g of terephthalic acid, 88.5 g of ethylene glycol, 118.7 g of neopentyl glycol, 101.0 g of 1,6-hexandiol and 0.13 g of zinc acetate as a catalyst were mixed, and the mixture was subjected to esterification reaction at 180 to 220° C. under a nitrogen gas stream. After a prescribed amount of water was distilled, 107.9 g of adipic acid and 21.1 g of dimer acid were added thereto, and the reaction product was subjected to esterification reaction at 220 to 230° C. The reaction system was then gradually depressurized, and the reaction product was subjected to condensation reaction at 220 to 230° C. for 60 minutes, followed by the condensation reaction at 220 to 230° C., 133 to 266 Pa for 4 hours, to give a polyester polyol having a number average molecular weight of 5000. The polyester polyol thus obtained was dissolved in 591.7 g of ethyl acetate, to produce Polyol B in the form of a solution having a solid content of 50%.

Synthesis Example 3

Production of Polyol C

The polyester polyol of Polyol B obtained in Synthesis Example 2 which was not yet diluted with the ethyl acetate was further subjected to condensation reaction at 220 to 230° C., 133 to 266 Pa for 4 hours, to give a polyester polyol having a number average molecular weight of 20000. The polyester polyol thus obtained was dissolved in 577.6 g of ethyl acetate, to produce Polyol C in the form of a solution having a solid content of 50%.

Synthesis Example 4

Production of Polyol D

The amount 529.4 g of isophthalic acid, 128.8 g of ethylene glycol and 302.4 g of neopentyl glycol were mixed, and the mixture was subjected to esterification reaction at 180 to 220° C. under a nitrogen gas stream. After a prescribed amount of water was distilled, 214.8 g of sebacic acid was added thereto and the reaction product was subjected to esterification reaction at 180 to 220° C., to give a polyester polyol having a number average molecular weight of 2500. The total amount of the polyester polyol thus obtained was dissolved in 428.6 g of ethyl acetate, to produce a solution having a solid content of 70%. Subsequently, 47.35 g of isophorone diisocyanate was added to 613.8 g of the polyester polyol thus produced under a nitrogen atmosphere. Then, the polyester polyol was subjected to urethane reaction at 77 to 80° C. for 3 hours. Thereafter, 0.10 g of tin (II) octylate as a catalyst was added thereto and the reaction product was further subjected to the urethane reaction for 3 hours. After completion of the urethane reaction, the reaction product was cooled down to 70° C., and 292.97 g of ethyl acetate was then added thereto, to produce Polyol D in the form of a solution having a solid content of 50%. The Polyol D thus produced had a number average molecular weight of 20000.

Synthesis Example 5

Production of Polyol E

The amount 367.9 g of isophthalic acid and 404.9 g of 1,6-hexandiol were mixed, and the mixture was subjected to esterification reaction at 160 to 220° C. under a nitrogen gas stream. After a prescribed amount of water was distilled, 316.9 g of dimer acid and 29.5 g of isophorone diamine were added thereto and the reaction product was subjected to amide reaction at 220 to 230° C., to give a polyester polyamide polyol having a number average molecular weight of 1500. Subsequently, 47.4 g of isophorone diisocyanate was added to 400.0 g of the polyester polyamide polyol thus obtained under a nitrogen atmosphere. Then, the polyester polyamide polyol was subjected to urethane reaction at 77 to 80° C. for 3 hours. Thereafter, 0.10 g of tin (II) octylate as a catalyst was added thereto, and the reaction product was further subjected to the urethane reaction for 3 hours. After completion of the urethane reaction, the reaction product was cooled down to 70° C., and 447.4 g of ethyl acetate was then added thereto, to produce Polyol E in the form of a solution having a solid content of 50%. The Polyol E thus produced had a number average molecular weight of 20000.

Synthesis Example 6

Production of Polyol F

The amount 240.0 g of isophthalic acid, 336.0 g of sebacic acid, 168.0 g of neopentyl glycol and 224.0 g of 1,6-hexandiol were mixed, and the mixture was subjected to esterification reaction at 180 to 220° C. under a nitrogen gas stream, to give a polyester polyol having a number average molecular weight of 3000. Subsequently, 23.6 g of isophorone diisocyanate was added to 400.0 g of the polyester polyol thus obtained under a nitrogen atmosphere. Then, the polyester polyol was subjected to urethane reaction at 100 to 150° C. for 6 hours. After completion of the urethane reaction, the reaction product was cooled down to 70° C., and 423.6 g of ethyl acetate was then added thereto, to produce Polyol F in the form of a solution having a solid content of 50%. The Polyol F thus produced had a number average molecular weight of 20000.

Synthesis Example 7

Production of Acid-Modified Polyol A

The amount 8.0 g of trimellitic anhydride was added to 500.0 g of the polyester polyol obtained in Synthesis Example 1 which was not yet dissolved in the ethyl acetate, for reaction at 140 to 150° C. Thereafter, the reaction product was dissolved in 508.0 g of ethyl acetate, to produce Acid-Modified Polyol A in the form of a solution having a solid content of 50%. The Acid-Modified Polyol A thus produced had an acid value of 4.5 mg KOH/g, and the trimellitic anhydride was reacted with 23% by mol of all the terminal hydroxyl groups of the polyester polyol. The Acid-Modified Polyol A does not contain any hydrocarbon moiety having 12 to 80 carbon atoms in its molecule.

Synthesis Example 8

Production of Acid-Modified Polyol B

The amount 8.0 g of trimellitic anhydride was added to 500.0 g of the polyester polyol obtained in Synthesis Example 2 which was not yet distilled in the ethyl acetate, for reaction at 140 to 150° C. Thereafter, the reaction product was dissolved in 508.0 g of ethyl acetate, to produce Acid-Modified Polyol B in the form of a solution having a solid content of 50%. The Acid-Modified Polyol B thus produced had an acid value of 4.5 mg KOH/g, and the trimellitic anhydride was reacted with 21% by mol of all the terminal hydroxyl groups of the polyester polyol. The Acid-Modified Polyol B does not contain any hydrocarbon moiety having 12 to 80 carbon atoms in its molecule.

Synthesis Example 9

Production of Acid-Modified Polyol C

The amount 256.0 g of isophthalic acid, 168.0 g of adipic acid, 96.0 g of ethylene glycol, 160.0 g of neopentyl glycol and 72.0 g of 1,6-hexandiol were mixed, and the mixture was subjected to esterification reaction at 160 to 220° C. under a nitrogen gas stream. After a prescribed amount of water was distilled, 329.6 g of isophthalic acid and 580.8 g of adipic acid were added thereto and the reaction product was subjected to esterification reaction at 220 to 230° C. The reaction system was then gradually depressurized, and the reaction product was subjected to condensation reaction at 220 to 230° C. for 60 minutes, followed by the condensation reaction at 220 to 230° C., 133 to 266 Pa for 2 hours, to give a polyester polyol having a number average molecular weight of 4000. 7.0 g of trimellitic anhydride was added to 500.0 g of the polyester polyol, for reaction at 140 to 150° C. Thereafter, the reaction product was dissolved in 507.0 g of ethyl acetate, to produce Acid-Modified Polyol C in the form of a solution having a solid content of 50%. The Acid-Modified Polyol C thus produced had an acid value of 4.0 mg KOH/g, and the trimellitic anhydride was reacted with 15% by mol of all the terminal hydroxyl groups of the polyester polyol. The Acid-Modified Polyol C does not contain any hydrocarbon moiety having 12 to 80 carbon atoms in its molecule.

Synthesis Example 10

Production of Acid-Modified Polyol D

The amount 57.6 g of trimellitic anhydride was added to 347.8 g of castor oil, for reaction at 100 to 110° C. Thereafter, the reaction product was dissolved in 405.4 g of ethyl acetate, to produce Acid-Modified Polyol D in the form of a solution having a solid content of 50%. The Acid-Modified Polyol D thus produced had an acid value of 45 mg KOH/g, and the trimellitic anhydride was reacted with 30% by mol of all the terminal hydroxyl groups of the caster oil. The Acid-Modified Polyol D contains a hydrocarbon moiety having 12 to 80 carbon atoms in its molecule in an amount of about 80% by weight.

Synthesis Example 11

Production of Acid-Modified Polyol E

The amount 115.2 g of trimellitic anhydride was added to 347.8 g of castor oil, for reaction at 100 to 110° C. Thereafter, the reaction product was dissolved in 463.0 g of ethyl acetate, to produce Acid-Modified Polyol E in the form of a solution having a solid content of 50%. The Acid-Modified Polyol E thus produced had an acid value of 74 mg KOH/g, and the trimellitic anhydride was reacted with 60% by mol of all the terminal hydroxyl groups of the caster oil. The Acid-Modified Polyol E contains a hydrocarbon moiety having 12 to 80 carbon atoms in its molecule in an amount of about 70% by weight.

Synthesis Example 12

Production of Acid-Modified Polyol F

The amount 33.34 g of isophorone diisocyanate was added to 347.8 g of caster oil under a nitrogen atmosphere, for urethane reaction at 100 to 110° C. for 5 hours. Subsequently, 68.45 g of trimellitic anhydride was added to a derivative of the castor oil, for reaction at 100 to 110° C. Thereafter, the reaction product was dissolved in 449.59 g of ethyl acetate, to produce Acid-Modified Polyol F in the form of a solution having a solid content of 50%. The Acid-Modified Polyol F thus produced had an acid value of 25 mg KOH/g, and the trimellitic anhydride was reacted with 50% by mol of all the terminal hydroxyl groups of the caster oil. The Acid-Modified Polyol F contains a hydrocarbon moiety having 12 to 80 carbon atoms in its molecule in an amount of about 80% by weight.

Synthesis Example 13

Production of Acid-Modified Polyol G

The amount 181.9 g of isophthalic acid and 210.3 g of 1,6-hexandiol were mixed, and the mixture was subjected to esterification reaction at 180 to 220° C. under a nitrogen gas stream. After a prescribed amount of water was distilled, 157.1 g of dimer acid was added thereto and the reaction product was subjected to esterification reaction at 180 to 220° C. The reaction system was then gradually depressurized, and the reaction product was subjected to condensation reaction at 220 to 230° C. for 60 minutes, followed by the condensation reaction at 220 to 230° C., 133 to 266 Pa for 4 hours, to give a dimer acid ester-containing polyester polyol having a number average molecular weight of 1500. 41.7 g of trimellitic anhydride was added to 500.0 g of the dimer acid ester-containing polyester polyol thus obtained, for reaction at 140 to 150° C. Thereafter, the reaction product was dissolved in 541.7 g of ethyl acetate, to produce Acid-Modified Polyol G in the form of a solution having a solid content of 50%. The Acid-Modified Polyol G thus produced had an acid value of 23 mg KOH/g, and the trimellitic anhydride was reacted with 33% by mol of all the terminal hydroxyl groups of the dimer acid ester-containing polyester polyol. The Acid-Modified Polyol G contains a hydrocarbon moiety having 12 to 80 carbon atoms in its molecule in an amount of about 31% by weight.

Synthesis Example 14

Production of Acid-Modified Polyol H

The amount 117.6 g of isophthalic acid, 29.4 g of terephthalic acid and 194.3 g of 1,6-hexandiol were mixed, and the mixture was subjected to esterification reaction at 180 to 220° C. under a nitrogen gas stream. After a prescribed amount of water was distilled, 203.3 g of dimer acid was added thereto and the reaction product was subjected to esterification reaction at 180 to 220° C. The reaction system was then gradually depressurized, and the reaction product was subjected to condensation reaction at 220 to 230° C. for 60 minutes, followed by the condensation reaction at 220 to 230° C., 133 to 266 Pa for 4 hours, to give a dimer acid ester-containing polyester polyol having a number average molecular weight of 1500. 41.7 g of trimellitic anhydride was added to 500.0 g of the dimer acid ester-containing polyester polyol thus obtained, for reaction at 140 to 150° C. Thereafter, the reaction product was dissolved in 541.7 g of ethyl acetate, to produce Acid-Modified Polyol H in the form of a solution having a solid content of 50%. The Acid-Modified Polyol H thus produced had an acid value of 23 mg KOH/g, and the trimellitic anhydride was reacted with 33% by mol of all the terminal hydroxyl groups of the dimer acid ester-containing polyester polyol. The Acid-Modified Polyol H contains a hydrocarbon moiety having 12 to 80 carbon atoms in its molecule in an amount of about 40% by weight.

Synthesis Example 15

Production of Acid-Modified Polyol I

The amount 93.7 g of isophthalic acid, 23.4 g of terephthalic acid and 180.6 g of 1,6-hexandiol were mixed, and the mixture was subjected to esterification reaction at 180 to 220° C. under a nitrogen gas stream. After a prescribed amount of water was distilled, 242.9 g of dimer acid was added thereto and the reaction product was subjected to esterification reaction at 180 to 220° C. The reaction system was then gradually depressurized, and the reaction product was subjected to condensation reaction at 220 to 230° C. for 60 minutes, followed by the condensation reaction at 220 to 230° C., 133 to 266 Pa for 4 hours, to give a dimer acid ester-containing polyester polyol having a number average molecular weight of 1500. 41.7 g of trimellitic anhydride was added to 500.0 g of the dimer acid ester-containing polyester polyol thus obtained, for reaction at 140 to 150° C. Thereafter, the reaction product was dissolved in 541.7 g of ethyl acetate, to produce Acid-Modified Polyol I in the form of a solution having a solid content of 50%. The Acid-Modified Polyol I thus produced had an acid value of 23 mg KOH/g, and the trimellitic anhydride was reacted with 33% by mol of all the terminal hydroxyl groups of the dimer acid ester-containing polyester polyol. The Acid-Modified Polyol I contains a hydrocarbon moiety having 12 to 80 carbon atoms in its molecule in an amount of about 50% by weight.

Synthesis Example 16

Production of Acid-Modified Polyol J

The amount 57.6 g of trimellitic anhydride was added to 347.8 g of hydrogenated castor oil, for reaction at 100 to 110° C. Thereafter, the reaction product was dissolved in 405.4 g of ethyl acetate, to produce Acid-Modified Polyol J in the form of a solution having a solid content of 50%. The Acid-Modified Polyol J thus produced had an acid value of 45 mg KOH/g, and the trimellitic anhydride was reacted with 30% by mol of all the terminal hydroxyl groups of the hydrogenated caster oil. The Acid-Modified Polyol J contains a hydrocarbon moiety having 12 to 80 carbon atoms in its molecule in an amount of about 80% by weight.

Synthesis Example 17

Production of Organic Polyisocyanate Compound A

The amount 75 g of TAKENATE A-10 (trimethylolpropane adduct of xylene diisocyanate, available from Mitsui Takeda Chemicals, Inc.) and 25 g of TAKENATE A-40 (trimethylolpropane adduct of 3-isocyanatomethyl-3,5,5-trimethylcyclohexyl isocyanate, available from Mitsui Takeda Chemicals, Inc.) were homogeneously mixed at 50° C. under a nitrogen atmosphere,to produce Organic Polyisocyanate Compound A.

Preparation of Examples and Comparative Examples

Polyols A to F, Acid-Modified Polyols A to J, Polyisocyanate A, all thus produced, silane coupling agent A (γ-glycidoxypropyltrimetoxysilane: KBM-403, available from Shin-Etsu Chemical Co., Ltd.), silane coupling agent B (N-β (aminoethyl)γ-aminopropyl trimethoxysilane: KBM-603, available from Shin-Etsu Chemical Co., Ltd.) and phosphoric acid were mixed according to the formulation and the ratio listed in Table 1, to prepare laminating adhesives of Examples 1 to 11 and Comparative Examples 1 to 6. The acid values of the laminating adhesives are also listed in Table 1.

Composite films were produced in the manner described later using each of the obtained laminating adhesives. Thereafter, adhesion test under moist heat, hot-water-resistance test and content resistance test between the plastic film and the aluminum foil were conducted with each of the produced composite films. The results are shown in Table 2.

Production of Four-Layer Composite Film

Four-layer composite films (composite films A), each including a polyethylene terephthalate film (12 μm in thickness)/a nylon film (15 μm in thickness, double-sided corona discharge treatment)/an aluminum foil (9 μm in thickness)/an unextended polypropylene film (60 μm in thickness, surface corona discharge treatment), and four-layer composite films (composite films B), each including a polyethylene terephthalate film (12 μm in thickness)/a nylon film (25 μm in thickness, double-sided corona discharge treatment)/an aluminum foil (9 μm in thickness)/an unextended polypropylene film (60 μm in thickness, surface corona discharge treatment), were produced using the laminating adhesives of the respective Examples and Comparative Examples. More specifically, the laminating adhesives of Examples and Comparative Examples listed in Table 1 were each applied to the polyethylene terephthalate film at room temperature using a laminator, first, and then, after the solvent was evaporated, the applied surface of the polyethylene terephthalate film was bonded to the nylon film. Subsequently, the laminating adhesives of Examples and Comparative Examples were each applied to the other surface of the nylon film of the two-layer composite film in the same manner as above, and then, after the solvent was evaporated, the applied surface of the nylon film was bonded to the aluminium foil. Subsequently, the laminating adhesives of Examples and Comparative Examples were each applied to the other surface of the aluminium foil of the three-layer composite film in the same manner as above, and then, after the solvent was evaporated, the applied surface of the aluminium foil was bonded to the unextended polypropylene film. Thereafter, those four-layer composite films were aged at 50° C. for 3 days, to cure the laminating adhesives.

Adhesion Test under Moist Heat

Specimens having a size of 300 mm (length)×15 mm (width) was prepared from each of the composite films A produced in the manner mentioned above. Using an Instron type tensile testing machine, the adhesive strength (adhesive strength under moist heat) was measured at a peeling rate of 300 mm/min in the hot water bath heated to 90° C. The measured value was represented by averaging the adhesive strengths (g/15 mm) between the aluminum foil and the unextended polypropylene film (inner layer) (between AL/CPP) for five specimens.

Hot Water Resistance Test

A bag having a size of 13 cm×17 cm was made using each of the composite films A and B produced in the manner mentioned above, and water was packed in the bag as content. The bag with the content was then sterilized by hot water at 135° C. for 20 minutes under the pressure of 3.5 kg/cm$^2$ with 8 rotations per minute. Thereafter, observation was made on the state of peeling between the aluminum foil and the nylon film (outer layer) (between NY/AL). The test was conducted on five bags for each composite film.

Content Resistance Test

A bag having a size of 13 cm×17 cm was made using each of the composite films A produced in the manner mentioned above, and a mixture of vinegar/oil/catsup=1/1/1 (ratio by vol.) was packed in the bag as content. The bag with the content was then sterilized by hot water at 135° C. for 20 minutes under the pressure of 3.5 kg/cm$^2$. The adhesive strength (g/15 mm) between the aluminum foil and the nylon film (outer layer) (between NY/AL) was measured immediately after the hot water sterilization treatment and after 14-day storage at 60° C. The measured value was represented by averaging the adhesive strengths for five specimens. Observation was made on the state of peeling between the aluminum foil and the unextended polypropylene film (inner layer) (between AL/CPP) after the 14-day storage at 60° C. The test was conducted on five bags.

TABLE 1

| | | (parts by weight) | | | | | | | | | | | | |
|---|---|---|---|---|---|---|---|---|---|---|---|---|---|---|
| | | Adhesive Composition | | | | | | | | | | | | |
| | | Polyol | | | | | | Acid-Modified Polyol | | | | | | |
| | No. | A | B | C | D | E | F | A | B | C | D | E | F | G |
| Examples | 1 | | | 90.0 | 5.0 | | | | | 5.0 | | | | |
| | 2 | | | 88.0 | 5.0 | | | | | 7.0 | | | | |
| | 3 | | | 90.0 | 5.0 | | | | | 5.0 | | | | |
| | 4 | | | 5.0 | | 90.0 | | | | 5.0 | | | | |
| | 5 | | | 92.0 | 5.0 | | | | | | | 3.0 | | |
| | 6 | | | 89.0 | 5.0 | | | | | | | 6.0 | | |
| | 7 | | | 86.0 | 5.0 | | | | | | | | | 9.0 |
| | 8 | | | 85.0 | 5.0 | | | | | | | | | 10.0 |
| | 9 | | | 85.0 | 5.0 | | | | | | | | | |
| | 10 | | | 85.0 | 5.0 | | | | | | | | | |
| | 11 | | | 90.0 | 5.0 | | | | | | | | | |
| Comparative Examples | 1 | 45.0 | | | 5.0 | | | 50.0 | | | | | | |
| | 2 | | 45.0 | | 5.0 | | | 50.0 | | | | | | |
| | 3 | | | 45.0 | 5.0 | | | 50.0 | | | | | | |
| | 4 | | | 45.0 | 5.0 | | | | | | 50.0 | | | |
| | 5 | | | | 50.0 | | | 50.0 | | | | | | |
| | 6 | | | | | | 50.0 | | | | 50.0 | | | |

TABLE 1-continued (parts by weight)

| | | Adhesive Composition | | | | | | | |
|---|---|---|---|---|---|---|---|---|---|
| | | Acid-Modified Polyol | | | Organic Polyisocyanate Compound | Silane Coupling Agent | | Phosphoric Acid | Acid Value (mg KOH/g) |
| | No. | H | I | J | A | A | B | | |
| Examples | 1 | | | | 8.3 | 0.5 | 0.2 | 0.1 | 2.3 |
| | 2 | | | | 8.3 | 0.5 | 0.2 | 0.1 | 3.2 |
| | 3 | | | | 8.3 | 0.5 | — | — | 2.3 |
| | 4 | | | | 8.3 | 0.5 | 0.2 | 0.1 | 2.3 |
| | 5 | | | | 8.3 | 0.5 | 0.2 | 0.1 | 2.2 |
| | 6 | | | | 8.3 | 0.5 | 0.2 | 0.1 | 4.4 |
| | 7 | | | | 8.3 | 0.5 | 0.2 | 0.1 | 2.3 |
| | 8 | | | | 8.3 | 0.5 | 0.2 | 0.1 | 2.3 |
| | 9 | 10.0 | | | 8.3 | 0.5 | 0.2 | 0.1 | 2.3 |
| | 10 | | 10.0 | | 8.3 | 0.5 | 0.2 | 0.1 | 2.3 |
| | 11 | | | 5.0 | 8.3 | 0.5 | 0.2 | 0.1 | 2.3 |
| Comparative Examples | 1 | | | | 8.3 | 0.5 | 0.2 | 0.1 | 2.3 |
| | 2 | | | | 8.3 | 0.5 | 0.2 | 0.1 | 2.3 |
| | 3 | | | | 8.3 | 0.5 | 0.2 | 0.1 | 2.3 |
| | 4 | | | | 8.3 | 0.5 | 0.2 | 0.1 | 2.3 |
| | 5 | | | | 8.3 | 0.5 | 0.2 | 0.1 | 2.3 |
| | 6 | | | | 7.5 | — | — | 0.2 | 2.0 |

TABLE 2

| | Adhesive No. | Hot Water Resistance Test | | Adhesion Test Under Moist Heat |
|---|---|---|---|---|
| | | Composite Film A State of Peeling (between NY/AL) | Composite Film B State of Peeling (between NY/AL) | Peeling Strength in 90° C. Hot Water (N/15 mm) |
| Examples | 1 | No Peeling | No Peeling | 3.7 |
| | 2 | No Peeling | Slightly Peeled | 3.6 |
| | 3 | No Peeling | No Peeling | 3.6 |
| | 4 | No Peeling | No Peeling | 3.4 |
| | 5 | No Peeling | No Peeling | 3.7 |
| | 6 | No Peeling | Slightly Peeled | 3.5 |
| | 7 | No Peeling | No Peeling | 3.5 |
| | 8 | No Peeling | Slightly Peeled | 2.9 |
| | 9 | No Peeling | No Peeling | 3.1 |
| | 10 | No Peeling | No Peeling | 3.4 |
| | 11 | No Peeling | No Peeling | 3.5 |
| Comparative Examples | 1 | No Peeling | Peeled | 2.0 |
| | 2 | No Peeling | Peeled | 2.2 |
| | 3 | No Peeling | Peeled | 2.3 |
| | 4 | No Peeling | Peeled | 2.2 |
| | 5 | No Peeling | Completely Peeled | 1.6 |
| | 6 | No Peeling | Peeled | 2.3 |

| | Adhesive No. | Content Resistance Test | | |
|---|---|---|---|---|
| | | Immediately After | After 14-day Storage at 60° C. | |
| | | Hot-Water Sterilization Adhesive Strength (N/15 mm) | Adhesive Strength (N/15 mm) | State of Peeling (between AL/CPP) |
| Examples | 1 | 15.0 | 10.0 | No Peeling |
| | 2 | 14.5 | 10.0 | No Peeling |
| | 3 | 14.5 | 10.0 | No Peeling |
| | 4 | 14.0 | 9.5 | No Peeling |
| | 5 | 15.0 | 10.0 | No Peeling |
| | 6 | 14.5 | 9.5 | No Peeling |
| | 7 | 14.5 | 9.0 | No Peeling |
| | 8 | 14.5 | 9.5 | No Peeling |
| | 9 | 14.5 | 9.5 | No Peeling |
| | 10 | 14.0 | 9.0 | No Peeling |
| | 11 | 15.0 | 10.0 | No Peeling |
| Comparative Examples | 1 | 14.5 | 10.0 | No Peeling |
| | 2 | 14.0 | 10.0 | No Peeling |
| | 3 | 14.5 | 10.0 | No Peeling |

TABLE 2-continued

| | | | |
|---|---|---|---|
| 4 | 14.5 | 10.0 | No Peeling |
| 5 | 14.5 | 10.0 | No Peeling |
| 6 | 14.5 | 10.0 | No Peeling |

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The laminating adhesive of the present invention is useful for laminating films when packaging materials are produced in various industrial fields, including packaging materials for food products, beverages, medical products and quasi-drugs.

The invention claimed is:

1. A laminating adhesive comprising:
a polyol;
an acid-modified polyol obtained by reaction of a hydrophobic polyol containing a hydrocarbon moiety having 12 to 80 carbon atoms in its molecule in an amount of 30 to 95% by weight or a derivative thereof with an aromatic polycarboxylic acid anhydride and having a carboxyl group at a molecular terminal thereof;
an organic polyisocyanate compound; and
a silane coupling agent.
wherein the ratio of the acid-modified polyol relative to 100 parts by weight of the polyol is 1 to 15 parts by weight.

2. The laminating adhesive according to claim 1, wherein the hydrophobic polyol comprises castor oil and/or dimer acid ester-containing polyester polyol.

3. The laminating adhesive according to claim 1, wherein the acid-modified polyol is obtained by reaction of an aromatic polycarboxylic acid anhydride with 5% by mol or more of all terminal hydroxyl groups of the hydrophobic polyol or the derivative thereof.

4. The laminating adhesive according to claim 1, further comprising an oxyacid of phosphorus or a derivative thereof.

* * * * *